Patented Dec. 5, 1944

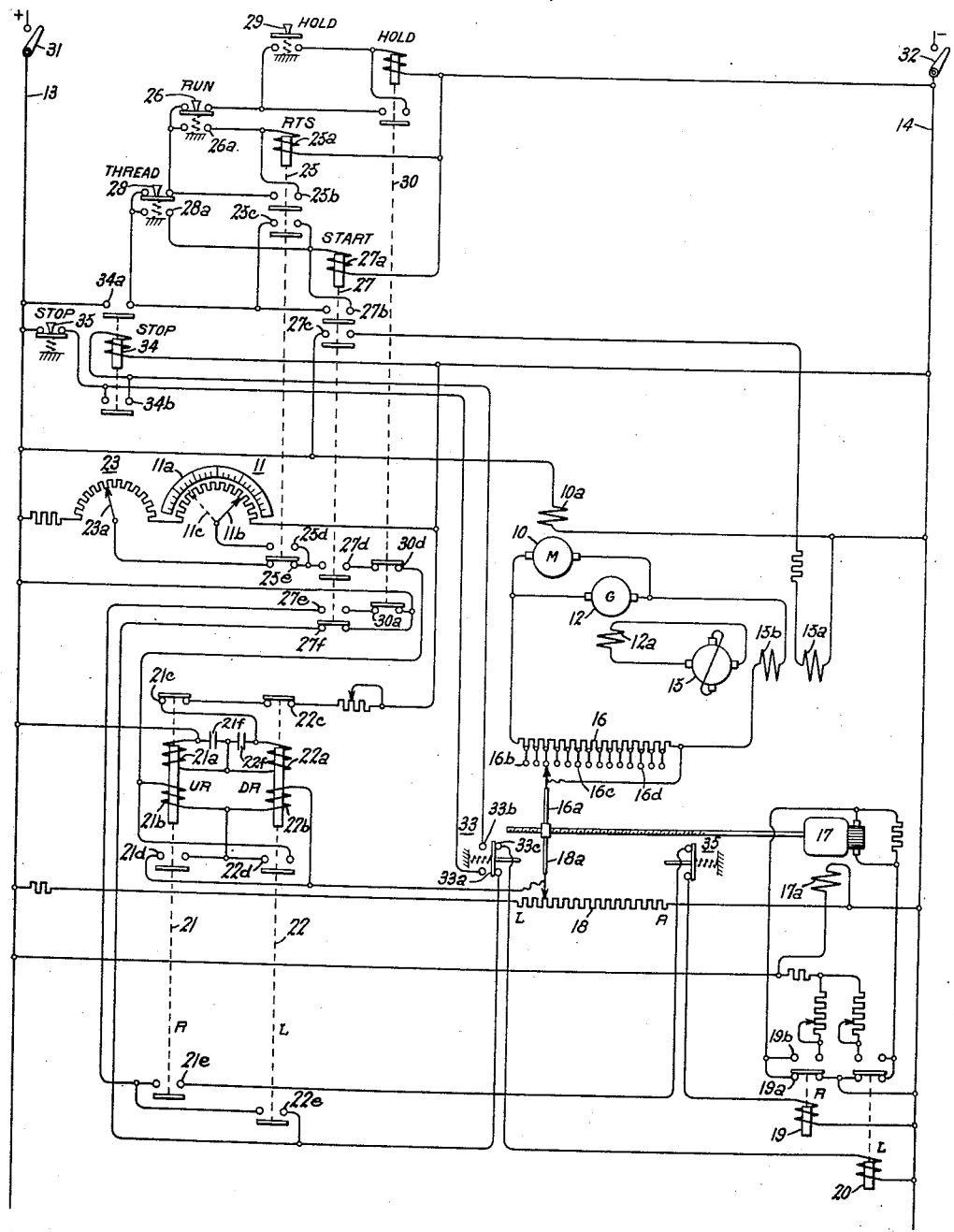

2,364,486

UNITED STATES PATENT OFFICE 2,364,486

CONTROL SYSTEM

George B. Starie, Schenectady, and Anton W. Schmitz, Scotia, N. Y., assignors to General Electric Company, a corporation of New York Application December 14, 1943, Serial No. 514,224

4 Claims. (Cl. 172—239)

This invention relates to control systems, more particularly to follow-up control systems, and it has for an object the provision of a simple, reliable, and improved control system of this character.

Another object of this invention is the provision of an inexpensive follow-up control system having a high degree of accuracy.

In carrying the invention into effect in one form thereof, two potentiometers are provided, of which one is the master potentiometer and the other is the follow-up potentiometer and is driven by an electric motor. The direction and amount of rotation of the follow-up motor are controlled by a pair of electromagnetic switching devices which are controlled by the differential voltage between the two potentiometers. Each of the two electromagnetic switching devices is provided with a main operating coil and with an auxiliary operating coil. In the normal or deenergized condition of the apparatus, the main operating coils of both potentiometers are connected in series relationship across a source of supply, and the auxiliary coils are connected in series relationship between the voltage pickoff points of the two potentiometers so as to be responsive to the differential voltage between these two pickoff points. The polarity of the coils of these electromagnetic switching devices is such that for one polarity of the differential voltage, the main and auxiliary coils of one of the switching devices are additive and those of the other device are subtractive or bucking. For the reverse polarity of the differential voltage, the coils of the second switching device are additive and those of the first switching device are subtractive. Each switching device in picking up deenergizes its main operating coil so that the dropout can be effected in response to the decrease of the potentiometer differential voltage. Additionally, each electromagnetic switching device in picking up short circuits the auxiliary coil of the other switching device so that the switching device which is picked up can be made to drop out at a predetermined low value of the differential voltage to stop the motor with the driven potentiometer in accurate correspondence with the master potentiometer.

For a better and more complete understanding of the invention, reference should now be had to the following specification and to the accompanying drawing of which the single figure is a simple, schematic diagram of an embodiment of the invention.

In illustrating the invention in one form thereof, it is shown as embodied in a control system for accurately presetting the operating speed of a motor on a master potentiometer, and maintaining the speed of the motor at a value corresponding to the preset value.

Referring now to the drawing, it is desired to preset the operating speed of a motor 10 while the motor is at rest or operating at some different speed, and subsequently to cause the speed of the motor to change to the preset speed and be maintained at that speed. The speed of the motor is preset on a master potentiometer 11 which is provided with a dial 11a calibrated in terms of speed.

The motor 10 is supplied from a suitable source, such as the adjustable voltage generator 12, which is driven at a suitable speed, which is preferably substantially constant, by any suitable driving means, such as an induction motor (not shown). As shown, the motor 10 is provided with a field winding 10a which is separately excited from a suitable source, such as represented by the supply lines 13, 14.

The generator 12 is provided with a separately excited field winding 12a which is excited from a cross armature flux excited, direct armature flux compensated dynamoelectric machine 15, which is provided with a main reference control field winding 15a and a voltage control field winding 15b. The reference field winding 15a is excited from a suitable source of constant excitation, such as the supply lines 13, 14, and the voltage control winding 15b is excited from the voltage of the generator 12. The reference field winding 15a is polarized in a direction to increase the voltage of the generator 12, and the voltage control field winding 15b is polarized in a direction to decrease the generator voltage. Thus, the voltage of the generator is dependent on the difference of the excitation of the two field windings 15a and 15b. When the voltage of the generator 12 is zero, the excitation of the voltage control field winding 15b is also zero, so that the reference field winding is unopposed and the net excitation of the dynamoelectric machine 15 is maximum. Maximum excitation of the machine 15 causes the generator voltage to rise at a rapid initial rate. Increasing the generator voltage increases the excitation of the field winding 15b, so that the net excitation of machine 15 decreases. The voltage of the generator 12 continues to increase but at a decreasing rate until a balanced condition is established such that any further decrease in the net excitation of the dynamoelectric machine 15 would result in a decrease in the voltage of the generator 12.

For the purpose of adjusting the voltage of the generator 12, a rheostat 16 is included in series relationship with the voltage control field winding 15b. The greater the amount of resistance that is included in the circuit with the voltage control field winding 15b, the higher must be the voltage of the generator 12 rise in order to bring about the balanced condition just described. Thus, by adjusting the rheostat 16, the voltage of the generator 12 and the speed of the motor 10 can be correspondingly adjusted.

In order to control the rate at which the speed of the motor 10 is changed from zero to a preset value, or from one preset value to another, the slider 16a of rheostat 16 is preferably driven at a substantially constant speed by an electric motor 17 which is supplied from a suitable source, such as the source 13, 14. The rheostat 16 may have as many as 100 buttons to provide 100 different speed settings of the motor 10, although a smaller number is shown in the drawing.

The motor 17 is utilized as the driving means of a follow-up control system to move the slider 16a to a position on the resistor 16 at which the speed of the motor 10 will correspond to the speed preset upon the master potentiometer 11. As shown, the master potentiometer 11 is connected across the supply source 13, 14.

Also included in this follow-up system is a potentiometer 18 which is connected across the source 13, 14 and is provided with a slider 18a which is driven by the motor 17.

The rotation of the motor 17 is controlled by suitable electromagnetic contactors 19 and 20 which, in turn, are controlled by the electromagnetic switching devices 21 and 22, respectively. It may be assumed that the contactor 19 connects the motor 17 to the source for rotation in a direction which moves the sliders 16a and 18a toward the right, and that the contactor 20 effects movement of these sliders toward the left. The switching devices 21 and 22 are selectively operated in response to the magnitude and polarity of the differential voltage between the slider 11b of the master potentiometer 11 and the slider 18a of the following potentiometer 18.

The switching devices 21 and 22 are provided with main operating coils 21a and 22a, respectively, connected in series relationship across the source 13, 14 and with auxiliary coils 21b and 22b, respectively, connected in series relationship between the slider 11b of the master potentiometer 11 and the slider 18a of the follow-up potentiometer 18. Capacitors 21f and 22f in parallel with main operating coils 21a and 22a respectively maintain the energizations of these coils immediately following the opening of contacts 21c and 22c, thereby to insure closure of these contactors. The polarity of the coils on these two switching devices is such that when the voltage of the slider 11b is negative with respect to the voltage of the slider 18a, the coils 21a and 21b are additive, and the coils 22a and 22b of the switching device 22 are subtractive or bucking.

For the purposes of illustration it may be assumed that the switching devices 21 and 22 pick up their armatures in response to an excitation of 360 ampere turns and drop out their armatures at an energization of 36 ampere turns. It may also be assumed that the main coils 21a and 22a each produce 270 ampere turns of the 360 ampere turns required for pickup, and that the coils 21b and 22b each produce the remaining 90 ampere turns of the 360 required for pickup. It may further be assumed that each of the coils 21b and 22b has 1280 turns and nine ohms resistance. Since each of the coils 21b and 22b has 1280 turns and each must produce 90 ampere turns for pickup, the current which must flow in these coils to produce 90 ampere turns is 0.07 ampere. Further, since both coils 21b and 22b are connected in series relationship between the sliders 11b and 18a, and since the total resistance of both coils in series is 18 ohms, the differential voltage between the sliders 11b and 18a required to cause 0.07 ampere to flow through the coils is 1.26 volts.

An additional potentiometer 23 is provided for presetting a low threading speed for the motor 10. For the purpose of selectively preparing a circuit between the slider 11b or slider 23a and slider 18a to initiate the operation, an electromagnetic contactor 25 and a suitable switching device illustrated as a manually operated momentary contact type push-button switch 26 for controlling the contactor 25 are provided. To complete the connection between the slider 23a or the slider 11b and the slider 18a of the follow-up potentiometer, a contactor 27 under the control of a push-button type switch 28 is provided.

The acceleration of the motor 10 from zero to a preset speed, or from one preset speed to another, may be interrupted after initiated by means of a switching device 29, and an electromagnetic contactor 30 controlled thereby for interrupting the connection between either the master potentiometer 11 or the threading potentiometer 23 and the follow-up potentiometer 18.

With the foregoing understanding of the elements and their organization, the operation of the system itself will readily be understood from the following detailed description. The switches 31 and 32 are closed to complete the connections of the supply lines 13, 14 to a suitable source of D. C. voltage. The field winding 10a of the motor 10 and the field winding 17a of the motor 17, which are connected across the supply lines 13, 14, are thus energized. The circuit of the reference field winding 15a of the dynamoelectric machine 15 is interrupted at the normally open contacts 27c of contactor 27. Consequently, the machine 15 generates zero voltage, and likewise, the voltage of the generator 12, which is excited from the machine 15, is zero. The driving motor 10 is therefore at rest.

In the deenergized condition of the apparatus the slider 18a is in its extreme left-hand position in which it moves the movable contact member 33a of the limit switch 33 into engagement with the stationary contact 33b, thereby to complete an energizing circuit for the operating coil of the stop contactor 34. This energizing circuit extends from the supply line 13 through the normally closed contacts of the stop push-button switch 35, contacts 33a and 33b of the limit switch, operating coil of contactor 34 to the side 14 of the source. In response to energization, contactor 34 closes its main contacts 34a and also closes its lower interlock contacts 34b to complete a sealing-in circuit which is independent of the contacts of the limit switch.

The speed at which it is desired to operate the motor 10 is preset upon the master potentiometer 11 by moving the slider 11b to a point on the potentiometer corresponding to the desired speed as indicated upon the calibrated dial 11a. Thereafter, the run push-button switch 26 is momentarily depressed to complete an energizing circuit for the operating coil of the contactor 25. This circuit extends from the side 13 of the source through the contacts 34a of the stop contactor 34 (in the closed position thereof), through the upper normally closed contacts of the "thread" push-button switch 28, contacts 26a of the push-button switch 26, operating coil 25a of contactor 25 to the opposite side 14 of the supply source. Contactor 25 responds and closes its contacts 25b to complete a sealing-in circuit for its coil independent of the contacts of the push button switch 26 which may now be released. Simultaneously, contactor 25 closes its normally open contacts 25c and 25d and opens its normally closed contacts 25e.

The closing of contacts 25c completes an energizing circuit for the operating coil 27a of the start contactor 27 which picks up in response to energization and seals itself in through contacts 27b. In picking up, contactor 27 also closes its normally open contacts 27c, 27d, 27e and opens its normally closed contacts 27f.

The closing of contacts 25d and 27d completes the connections from the slider 11b of the potentiometer 11 through the auxiliary coils 21b and 22b of switching devices 21 and 22, respectively, to the slider 18a of the follow-up potentiometer 18. If the slider 11b has been moved to a position on the potentiometer 11 such that the differential voltage between the slider 11b and the slider 18a is at least 1.26 volts, the ampere turns of the auxiliary coil 21b added to the ampere turns of the main operating coil 21a of switching device 21 will be sufficient to pick up the switching device 21. In the position in which the slider 11b is illustrated in the drawing, the differential voltage between the slider 11b and the slider 18a may be assumed to be greatly in excess of 1.26 volts and therefore the switching device 21 picks up to open its normally closed contacts 21c and close its normally open contacts 21d and 21e. Since the ampere turns of the operating coil 22b are subtractive with respect to the ampere turns of the main operating coil 22a, the switching device 22 is not picked up.

Contacts 21e in opening interrupt the energizing circuit for the main operating coil 21a. However, since the ampere turns produced by the auxiliary coil 21b required to pick up the switching device 21 is in excess of the dropout ampere turns, the switching device 21 remains picked up. The closing of the contacts 21d short circuits the auxiliary coil 22b of switching device 22, and consequently, the ampere turns of the auxiliary coil 21b are doubled.

Contacts 21e in closing complete an energizing circuit for the operating coil of the directional contactor 19 which is readily traced from the side 13 of the supply source through the normally closed contacts 30a of contactor 30, contacts 27e of start contactor 27, contacts 21e of switching device 21, normally closed contacts of limit switch 35, and operating coil of right directional contactor 19 to the side 14 of the source. Responsively to energization, contactor 19 picks up and opens its normally closed contacts 19a and closes its normally open contacts 19b to connect the armature of the motor 17 to the source 13, 14 for rotation in a direction to move the sliders 16a and 18a to the right.

As the slider 18a moves to the right, the differential voltage between the slider 11b and the slider 18a is decreased, and the ampere turns of the auxiliary winding 21b of switching device 21 are correspondingly decreased. Since the dropout value of the relay 21 is 36 ampere turns, and since the auxiliary coil 21b has 1280 turns, the switching device 21 will drop out when the coil current is decreased below 0.028 ampere. Since the resistance of the coil 21b is nine ohms, the current flow through the coil will be reduced to 0.028 ampere when the differential voltage between the slider 11b and the slider 18a is reduced to 0.252 volt. In other words, the switching device 21 will drop out when the slider 18a reaches a position on the potentiometer 18 which differs from a position of exact correspondence with the position of the slider 11b on the master potentiometer 11 by an amount which corresponds to approximately one-fourth of a volt on the follow-up potentiometer 18.

The dropping out of the switching device 21 interrupts the energizing circuit for the operating coil 19a of the contactor 19. Responsively to deenergization, contactor 19 drops out to disconnect the motor 17 from the source 13, 14, and also closes its normally closed contacts 19a to complete a dynamic braking circuit for the armature of the motor 17. As a result, the motor 17 is brought to rest with the slider 18a in a position which differs from a position of correspondence with respect to the position of the slider 11b by an amount which is equal to or less than an amount corresponding to one-fourth of a volt on the potentiometer 18.

The movement of the slider 18a to this new position corresponding to the preset position of the slider 11b also moves the slider 16a to a corresponding position on the rheostat 16, which corresponding position may be assumed to be represented by the button 16d.

The closing of contacts 27c in response to the closing of the start contactor 27 completes the connections of the reference field winding 15a of dynamoelectric machine 15 to the supply source 13, 14. As a result of the excitation of the reference field winding 15a, and the movement of the slider 16a to the button 16d on the rheostat 16, the voltage of the generator 12 is increased to a value corresponding to the position of the slider 11b of master potentiometer 11, and the motor 10 is accelerated to a corresponding speed.

If the auxiliary coil 22b had not been short circuited by the contacts 21d when switching device 21 picked up, the current in the coil 21b would have decreased to the dropout value when the differential voltage between the sliders decreased to 0.504 volt. Consequently, the motor 17 would have stopped with the slider 18a in a position which differs from a position of exact correspondence with respect to the position of slider 11b by an amount corresponding to approximately one-half volt on the potentiometer 18. In other words, if the auxiliary coil 22b had not been short circuited, the error in the stopping position of the slider 18a would have been twice as great. In practice, the distance between the buttons on the rheostat 16 is less than the length of a portion of the potentiometer 18 which corresponds to a voltage of one-quarter volt. Thus, it will be seen that the follow-up system results in stopping the slider 16a on that button contact of the potentiometer 16 which corresponds most exactly to the position of the slider 11b on the master potentiometer.

If it is desired to decrease the speed from the preset value to a lower value, the slider 11b may be moved in a counterclockwise direction to a position corresponding to the desired low speed, such for example as represented by the position of the dotted line 11c. As a result, the current flow through the auxiliary coils 21b and 22b will be in the reverse direction as compared with the direction of current flow when the slider 11b was moved in the clockwise direction. Thus, the ampere turns of the auxiliary coil 22b will be additive with respect to the ampere turns of the main operating coil 22a and, consequently, the switching device 22 will pick up to open its normally closed contacts 22c and close its normally open contacts 22d and 22e. Contacts 22e in opening interrupt the energizing circuit of the main operating coil 22a, and contacts 22d in closing short circuit the auxiliary operating coil 21b of switching device 21. The closing of contacts 22e completes an energizing circuit for the left directional contactor 20 which, responsively to energization, picks up and closes its normally open contacts to connect the armature of the motor 17 to the source 13, 14, for rotation in a direction to move the sliders 16a and 18a to the left. When the slider 18a reaches a position of correspondence with respect to the position of the slider 11b, the motor 17 is stopped and the slider 16a comes to rest on a button corresponding to the position of the slider 11b. Consequently, the voltage of the generator 12 is decreased to a corresponding value and the speed of the motor 10 is decelerated to a corresponding value.

To stop the motor 10, the stop push button 35 is depressed to interrupt the energizing circuit for the operating coil of the stop contactor 34. In response to deenergization, the stop contactor 34 opens its contacts 34a to interrupt the energizing circuit for the operating coils of the run contactor 25 and the start contactor 27, and these contactors in response to deenergization drop out to the positions in which they are illustrated in the drawing. In the dropped out position of the contactor 27, an energizing circuit for the operating coil of the left directional contactor 20 is completed which extends from the side 13 of the supply source through normally closed contacts 27f of contactor 27, contacts 33c of limit switch 33 (bridged by the movable contact member 33a when the slider 18a was moved to the right), operating coil of contactor 20 to the side 14 of the source. Responsively to energization, contactor 20 picks up and closes its normally open contacts to connect the motor 17 to the supply source 13, 14 for rotation in a direction to move the sliders 16a and 18a toward the left. At the extreme left limit of travel of the sliders 16a and 18a, the movable contacts 33a of the limit switch 33 are moved out of engagement with the stationary contacts 33c, thereby to interrupt the energizing circuit for the operating coil of contactor 20. In response to deenergization, contactor 20 disconnects the motor 17 from the supply source and the normally closed contacts of contactor 20 complete a dynamic braking circuit for the armature of the motor 17. The system is now in a reset condition.

If in starting up from rest, it is desired to operate the motor 10 at a low threading speed, this may be accomplished by moving the slider 23a of the threading potentiometer to a position corresponding to the desired low threading speed. The thread push-button switch 28 is then momentarily depressed to bridge the normally open contacts 28a to complete an energizing circuit for the operating coil of the start contactor 27, which circuit is traced from the side 13 of the supply source through the contacts 34a of the stop contactor (closed when the sliders 16a and 18a are in the left limiting position), contacts 28a of push button switch 28, operating coil 27a to the side 14 of the source. In response to energization, the start contactor 27 picks up and closes its normally open contacts 27b, 27c, 27d, and 27e and opens its normally closed contacts 27f. The run contactor 25 is not picked up and consequently its normally closed contacts 25e remain closed. Thus, a connection is completed between the slider 23a of the threading potentiometer 23 and the slider 18a of the follow-up potentiometer 18 through the contacts 25e, contacts 27d of start contactor 27, normally closed contacts 30d of close contactor 30, auxiliary coils 21b and 22b to the slider 18a. As a result, the motor 17 will be started and the sliders 18a and 16a moved to positions corresponding to the position of the slider 23a of the thread potentiometer in a manner similar to the operation described in the foregoing, and the motor 10 will be accelerated to a corresponding speed.

Although in accordance with the provisions of the patent statutes this invention is described as embodied in concrete form and the principle thereof has been explained, together with the best mode in which it is now contemplated applying that principle, it will be understood that modifications and alterations will readily occur to persons skilled in the art without departing from the spirit of this invention or from the scope of the annexed claims.

What we claim as new and desire to secure by Letters Patent of the United States is:

1. A follow-up control system comprising in combination, a master potentiometer, a driven potentiometer, a motor for driving said driven potentiometer, means responsive to a differential voltage between said potentiometers for controlling said motor to drive said driven potentiometer toward a position of zero differential voltage with respect to said master potentiometer comprising a pair of switching devices each provided with a main coil and an auxiliary coil, connections for connecting said main coils in series to a source, connections for connecting said auxiliary coils in series relationship between said potentiometers, the coils of one of said switching devices being connected for an additive relationship, and the coils of the other of said switching devices being connected for a differential relationship in response to a differential voltage of one polarity between said potentiometers thereby to provide for selective operation of said switching devices to effect rotation of said motor in a direction corresponding to the polarity of said differential voltage, and means responsive to operation of each of said switching devices for deenergizing the main coil thereof.

2. A follow-up control system comprising in combination, the master potentiometer, a driven potentiometer, a motor for driving said driven potentiometer, means responsive to a differential voltage between said potentiometers for controlling said motor to drive said driven potentiometer toward a position of zero differential voltage with respect to said master potentiometer comprising a pair of switching devices each provided with a main coil and an auxiliary coil, connections for connecting said main coils in series to a source, connections for connecting said auxiliary coils in series relationship between said potentiometers, said connections providing an additive relationship of the coils of one of said switching devices and a differential relationship of the coils of said other switching device in response to a differential voltage of one polarity between said potentiometers thereby to provide for selective operation of said switching devices to effect a rotation of said motor in a direction corresponding to the polarity of said differential voltage, and means responsive to operation of each of said switching devices for deenergizing the auxiliary coil of the other of said switching devices.

3. A follow-up control system comprising in combination, a master potentiometer, a driven potentiometer, a motor for driving said driven potentiometer, means responsive to a differential voltage between said potentiometers for controlling said motor to drive said driven potentiometer toward a position of zero differential voltage with respect to said master potentiometer comprising a pair of switching devices each provided with a main coil and an auxiliary coil, connections for connecting said main coils in series to a source, connections for connecting said auxiliary coils in series relationship between said potentiometers, the coils of one of said switching devices being connected for an additive relationship and the coils of the other of said switching devices being connected for a differential relationship in response to a differential voltage of one polarity between said potentiometers thereby to provide for selective operation of said switching devices to effect rotation of said motor in a direction corresponding to the polarity of said differential voltage, and means responsive to operation of each of said switching devices for deenergizing the main coil thereof and the auxiliary coil of the other of said switching devices thereby to stop said motor in response to a predetermined low value of said differential voltage.

4. A follow-up control system comprising in combination, a master potentiometer provided with a slider, a driven potentiometer provided with a slider, an electric motor for driving the slider of said driven potentiometer, means responsive to a differential voltage between said sliders for energizing said motor to drive said driven slider toward a position of zero differential voltage with respect to the slider of said master potentiometer comprising a pair of switching devices each provided with a main coil and an auxiliary coil, connections for connecting said main coils in series to a source, connections for connecting said auxiliary coils in series relationship between said sliders, said connections providing for an additive relationship of the coils of one of said switching devices and a differential relationship of the coils of the other of said switching devices in response to a voltage of one polarity between said sliders thereby to provide for selective operation of said switching devices to effect rotation of said motor in a direction corresponding to the polarity of said differential voltage, and means responsive to operation of each of said switching devices for deenergizing the main coil thereof and the auxiliary coil of the other of said devices to stop said driven slider at a point of substantially zero potential difference with respect to the slider of said master potentiometer.

GEORGE B. STARIE.
ANTON W. SCHMITZ.